United States Patent
Bailey et al.

(10) Patent No.: US 10,634,344 B2
(45) Date of Patent: Apr. 28, 2020

(54) FUEL NOZZLE ASSEMBLY WITH FUEL PURGE

(71) Applicant: General Electric Company, Schenectady, NY (US)

(72) Inventors: Donald Mark Bailey, Simpsonville, SC (US); Lucas John Stoia, Taylors, SC (US)

(73) Assignee: General Electric Company, Schenectady, NY (US)

( * ) Notice: Subject to any disclaimer, the term of this patent is extended or adjusted under 35 U.S.C. 154(b) by 670 days.

(21) Appl. No.: 15/384,367

(22) Filed: Dec. 20, 2016

(65) Prior Publication Data

US 2018/0209647 A1 Jul. 26, 2018

(51) Int. Cl.
*F23K 5/18* (2006.01)
*F23R 3/28* (2006.01)
*F02C 7/232* (2006.01)

(52) U.S. Cl.
CPC .............. *F23K 5/18* (2013.01); *F02C 7/232* (2013.01); *F23R 3/283* (2013.01); *F23R 3/286* (2013.01); *F05D 2260/602* (2013.01); *F23R 2900/00001* (2013.01); *F23R 2900/00012* (2013.01)

(58) Field of Classification Search
CPC .. F23R 3/28; F23R 3/283; F23R 3/286; F23R 2900/00001; F23R 2900/00004; F23R 2900/00012; F23K 5/18; F23D 14/62; F02C 7/232; F05D 2260/602
See application file for complete search history.

(56) References Cited

U.S. PATENT DOCUMENTS

| | | | | |
|---|---|---|---|---|
| 6,098,407 | A * | 8/2000 | Korzendorfer | F23C 7/002 60/737 |
| 7,752,850 | B2 * | 7/2010 | Laster | F23R 3/40 60/39.27 |
| 8,122,721 | B2 | 2/2012 | Johnson et al. | |
| 8,365,535 | B2 | 2/2013 | Widener et al. | |
| 8,662,502 | B2 * | 3/2014 | Stoia | F02C 7/22 277/572 |
| 8,894,407 | B2 * | 11/2014 | Stoia | F23R 3/286 431/12 |
| 8,959,921 | B2 | 2/2015 | Khan et al. | |
| 9,032,735 | B2 * | 5/2015 | Bellino | F23R 3/286 60/722 |
| 9,033,699 | B2 | 5/2015 | Stoia et al. | |
| 2006/0080966 | A1 * | 4/2006 | Widener | F02C 3/20 60/775 |

(Continued)

*Primary Examiner* — Gerald L Sung
*Assistant Examiner* — Alain Chau
(74) *Attorney, Agent, or Firm* — Dority & Manning, P.A.

(57) ABSTRACT

A fuel nozzle assembly includes a flange body including a stem. The flange body defines a flow passage therethrough. The fuel nozzle assembly further includes a conduit assembly having an inner tube that is disposed within an outer tube. A purge passage is defined radially between the inner tube and the outer tube and a fuel passage is defined within the inner tube. The outer tube and the inner tube are connected to the stem with the inner tube being connected to the stem via a flexible coupling disposed within the purge passage. The purge passage is in fluid communication with an inlet flow plenum and with a plurality of premix tubes of the fuel nozzle assembly.

19 Claims, 3 Drawing Sheets

(56) References Cited

U.S. PATENT DOCUMENTS

| | | | |
|---|---|---|---|
| 2007/0151255 A1* | 7/2007 | Johnson | F23D 14/48 60/776 |
| 2011/0089267 A1* | 4/2011 | Stoia | F02C 7/22 239/589 |
| 2012/0180486 A1* | 7/2012 | Kim | F23K 5/18 60/725 |
| 2013/0115561 A1 | 5/2013 | Melton et al. | |
| 2013/0122435 A1* | 5/2013 | Stoia | F23R 3/286 431/12 |
| 2013/0122436 A1 | 5/2013 | Stoia et al. | |
| 2013/0122438 A1* | 5/2013 | Stoia | F23R 3/286 431/144 |
| 2013/0232977 A1* | 9/2013 | Siddagangaiah | F23R 3/14 60/737 |
| 2013/0283798 A1* | 10/2013 | Bellino | F23R 3/286 60/722 |
| 2014/0250981 A1* | 9/2014 | Overby | F23R 3/28 73/40 |
| 2015/0135716 A1* | 5/2015 | Ginessin | F23R 3/28 60/737 |
| 2016/0146460 A1* | 5/2016 | Stewart | F23R 3/14 60/737 |
| 2016/0369701 A1* | 12/2016 | Pireyre | F02C 7/266 |
| 2017/0138268 A1* | 5/2017 | Nakahara | F02C 7/22 |

* cited by examiner

FUEL NOZZLE ASSEMBLY WITH FUEL PURGE

FIELD OF THE TECHNOLOGY

The present invention generally involves a combustor for a gas turbine. More specifically, the invention relates to a fuel nozzle assembly including a fuel purge circuit for fuel leak protection.

BACKGROUND

During operation of a gas turbine engine, pressurized air from a compressor flows into a head end volume defined within the combustor. The pressurized air flows from the head end volume into an inlet to a corresponding premix passage of a respective fuel nozzle assembly. Fuel is injected into the flow of pressurized air within the premix passage where it mixes with the pressurized air so as to provide a fuel and air mixture to a combustion zone or chamber defined downstream from the fuel nozzle. The fuel and air mixture is burned in the combustion chamber to produce hot combustion gases.

The fuel may be supplied to the fuel nozzle(s) via a conduit or tube which extends downstream from a flange. The flange may be connected an endcover or outer casing of the combustor. In certain configurations, a first or upstream end of the tube is connected to a stem of the flange via a flexible coupling and a second end of the tube is coupled to a body of the fuel nozzle assembly. The flange and the tube define a fuel passage between a fuel supply and the fuel plenum. The flexible coupling allows for differential thermal growth between the flange and the fuel nozzle body. Joints formed between the flexible coupling and the tube may be compromised over time.

BRIEF DESCRIPTION OF THE TECHNOLOGY

Aspects and advantages are set forth below in the following description, or may be obvious from the description, or may be learned through practice.

One embodiment of the present disclosure is directed to a fuel nozzle assembly. The fuel nozzle assembly includes a flange body including a flange portion and a stem. The flange body includes a flow passage defined through the flange portion and the stem. The fuel nozzle assembly further includes a conduit assembly. The conduit assembly includes an inner tube disposed within an outer tube. A purge passage is defined radially between the inner tube and the outer tube and a fuel passage is defined within the inner tube. The outer tube and the inner tube are connected to the stem. The inner tube is connected to the stem via a coupling disposed within the purge passage. The purge passage is in fluid communication with an inlet flow plenum of the fuel nozzle assembly. The fuel nozzle assembly further includes a plurality of premix tubes. Each premix tube of the plurality of premix tubes includes an inlet disposed within and in fluid communication with the inlet flow plenum.

Another embodiment of the present disclosure is directed to a combustor. The combustor includes an endcover that is coupled to an outer casing. The endcover and the outer casing at least partially define a high pressure plenum. A flange body connected is to the endcover. The flange body includes a flange portion and a stem that extends downstream from the flange portion. The flange body defines a flow passage through the flange portion and the stem. The combustor further includes a conduit assembly. The conduit assembly includes an inner tube that is disposed within an outer tube. A purge passage is defined radially between the inner tube and the outer tube and a fuel passage is defined within the inner tube. The outer tube is connected to the stem radially outwardly from the inner tube. The inner tube is connected to the stem via a coupling disposed within the purge passage. The combustor further includes a fuel nozzle assembly. The fuel nozzle assembly includes an inlet flow conditioner defining an inlet flow plenum, and a plurality of premix tubes where each premix tube of the plurality of premix tubes includes an inlet disposed within and in fluid communication with the inlet flow plenum. The purge passage of the conduit assembly is in fluid communication with the inlet flow plenum and with each respective inlet of the plurality of premix tubes.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which.

DETAILED DESCRIPTION

Figure 1:
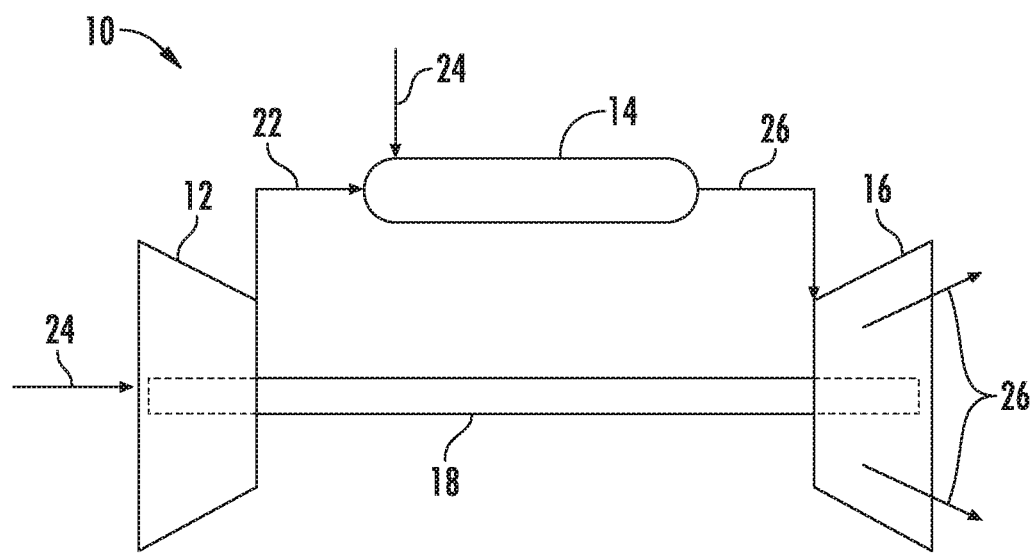
FIG. 1 is a functional block diagram of an exemplary gas turbine that may incorporate various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a combustor for a land based power generating gas turbine for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Referring now to the drawings, FIG. 1 illustrates a schematic diagram of an exemplary gas turbine 10. The gas turbine 10 generally includes a compressor 12, at least one combustor 14 disposed downstream of the compressor 12 and a turbine 16 disposed downstream of the combustor 14. Additionally, the gas turbine 10 may include one or more shafts 18 that couple the compressor 12 to the turbine 16.

During operation, air 20 flows into the compressor 12 where the air 20 is progressively compressed, thus providing compressed or pressurized air 22 to the combustor 14. At least a portion of the compressed air 22 is mixed with a fuel 24 within the combustor 14 and burned to produce combustion gases 26. The combustion gases 26 flow from the combustor 14 into the turbine 16, wherein energy (kinetic and/or thermal) is transferred from the combustion gases 26 to rotor blades (not shown), thus causing shaft 18 to rotate. The mechanical rotational energy may then be used for various purposes such as to power the compressor 12 and/or to generate electricity. The combustion gases 26 may then be exhausted from the gas turbine 10.

Figure 2:
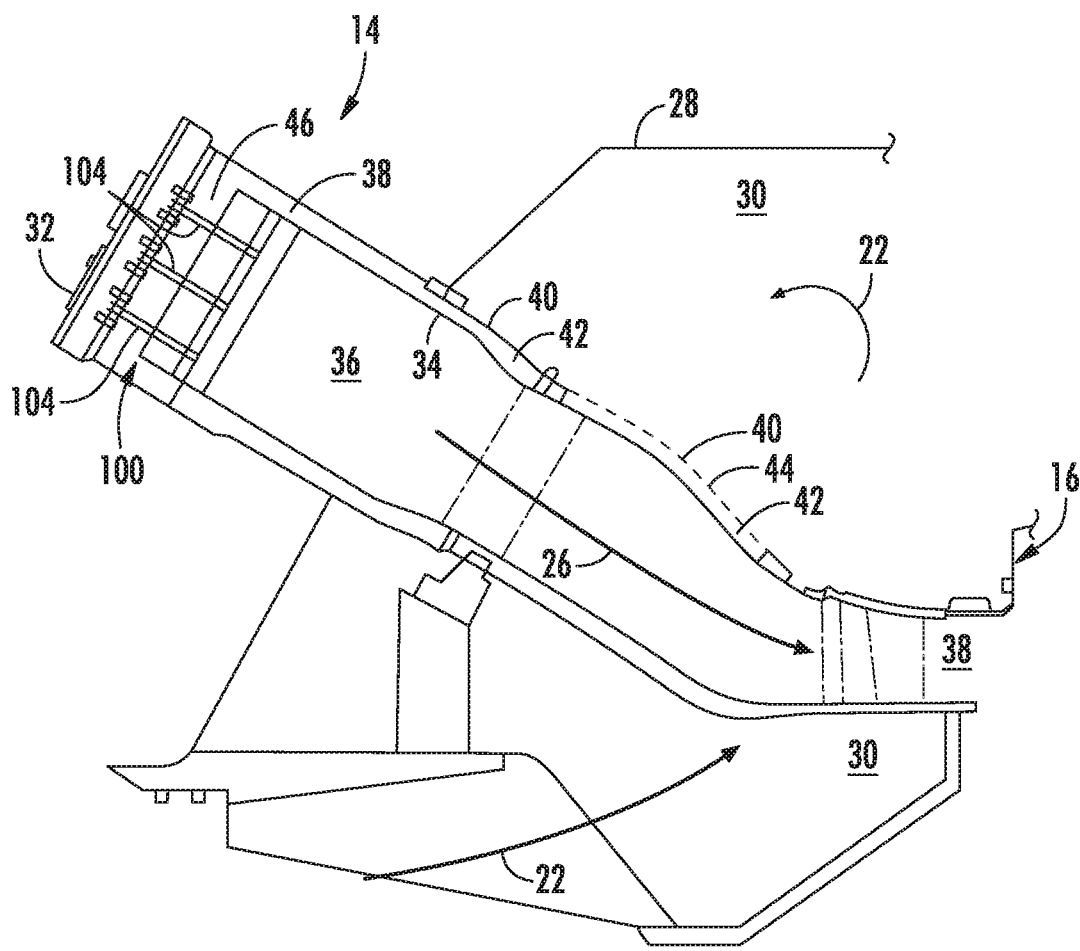
FIG. 2 is a simplified cross-section side view of an exemplary combustor as may incorporate various embodiments of the present disclosure.

As shown in FIG. 2, the combustor 14 may be at least partially surrounded by an outer casing 28 such as a compressor discharge casing. The outer casing 28 may at least partially define a high pressure plenum 30 that at least partially surrounds various components of the combustor 14. The high pressure plenum 30 may be in fluid communication with the compressor 12 (FIG. 1) so as to receive the compressed air 22 therefrom. An endcover 32 may be coupled to the outer casing 28. One or more combustion liners or ducts 34 may at least partially define a combustion chamber or zone 36 for combusting the fuel-air mixture and/or may at least partially define a hot gas path through the combustor 14 for directing the combustion gases 26 towards an inlet 38 to the turbine 16.

In particular embodiments, the combustion liner 34 is at last partially circumferentially surrounded by a flow sleeve 40. The flow sleeve 40 may be formed as a single component or by multiple flow sleeve segments. The flow sleeve 40 is radially spaced from the combustion liner 34 so as to define a flow passage or annular flow passage 42 therebetween. The flow sleeve 40 may define a plurality of inlets or holes 44 which provide for fluid communication between the flow passage 42 and the high pressure plenum 30. In particular embodiments, the endcover 32 and the outer casing 28 at least partially define a head end volume or plenum 46 of the combustor 14. The head end volume 46 may be in fluid communication with the high pressure plenum 30 via the flow passage 42. In various embodiments, as shown in FIG. 2, the combustor 14 includes a fuel nozzle assembly 100.

Figure 3:
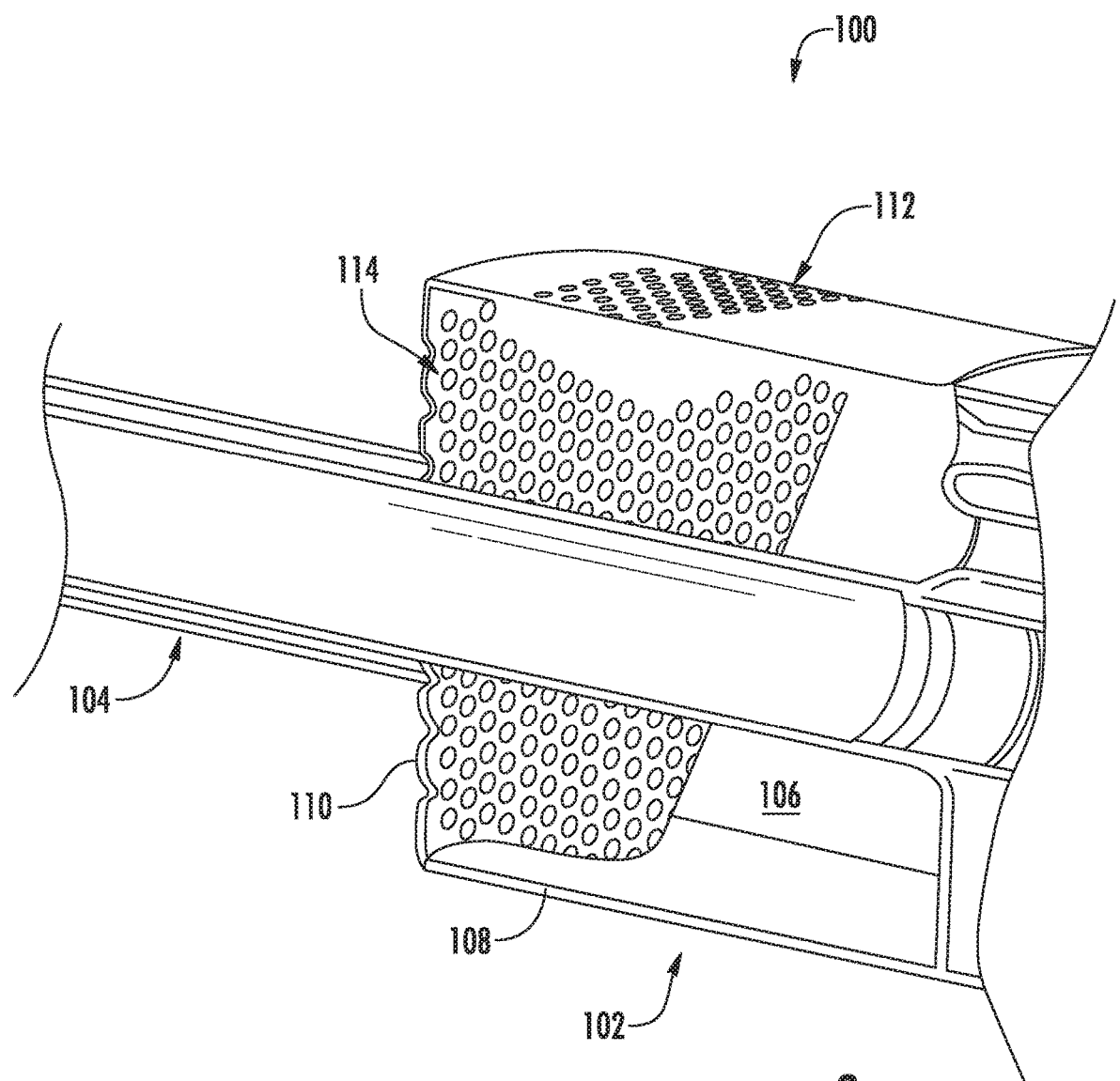
FIG. 3 is a cross-sectioned perspective view of a portion of an exemplary fuel nozzle assembly according to at least one embodiment of the present disclosure.

FIG. 3 provides a cross-sectioned perspective view of a portion of an exemplary fuel nozzle assembly 100 as may be incorporated in the combustor 14 as shown in FIG. 2, according to at least one embodiment of the present disclosure. In particular embodiments, as shown in FIG. 3, the fuel nozzle assembly 100 includes an inlet flow conditioner 102 and a conduit assembly 104. An inlet flow plenum 106 is defined within the inlet flow conditioner 102. In particular embodiments, the inlet flow conditioner 102 may include an outer sleeve 108 and a forward plate 110 which together may at least partially define the inlet flow plenum 106. The inlet flow plenum 106 may be in fluid communication with the high pressure plenum 30 (FIG. 2) via a plurality of apertures 112 defined in the outer sleeve 108 and/or via a plurality of apertures 114 defined in the forward plate 110.

The plurality of apertures 112 of the outer sleeve 108 may be radially oriented and circumferentially spaced about the outer sleeve 108. In particular embodiments, the plurality of apertures 112 may be uniformly spaced or distributed or may be non-uniformly spaced or distributed along the sleeve 108. In particular embodiments, the plurality of apertures 112 may be uniformly sized or may be sized differently at various axial locations along the outer sleeve 108. In particular embodiments, the plurality of apertures 112 may be uniformly shaped or may have different shapes defined at various axial locations along the outer sleeve 108.

In particular embodiments, at least a portion of the conduit assembly 104 extends through the forward plate 110. The plurality of apertures 114 of the forward plate 110 may be axially or otherwise oriented through the forward plate 110. In particular embodiments, the plurality of apertures 114 may be uniformly spaced or distributed or may be non-uniformly spaced or distributed along the forward plate 110. In particular embodiments, the plurality of apertures 114 may be uniformly sized or may be sized differently at various radial locations along the forward plate 110. In particular embodiments, the plurality of apertures 114 may be uniformly shaped or may have different shapes defined at various radial locations along the forward plate 110.

Figure 4:
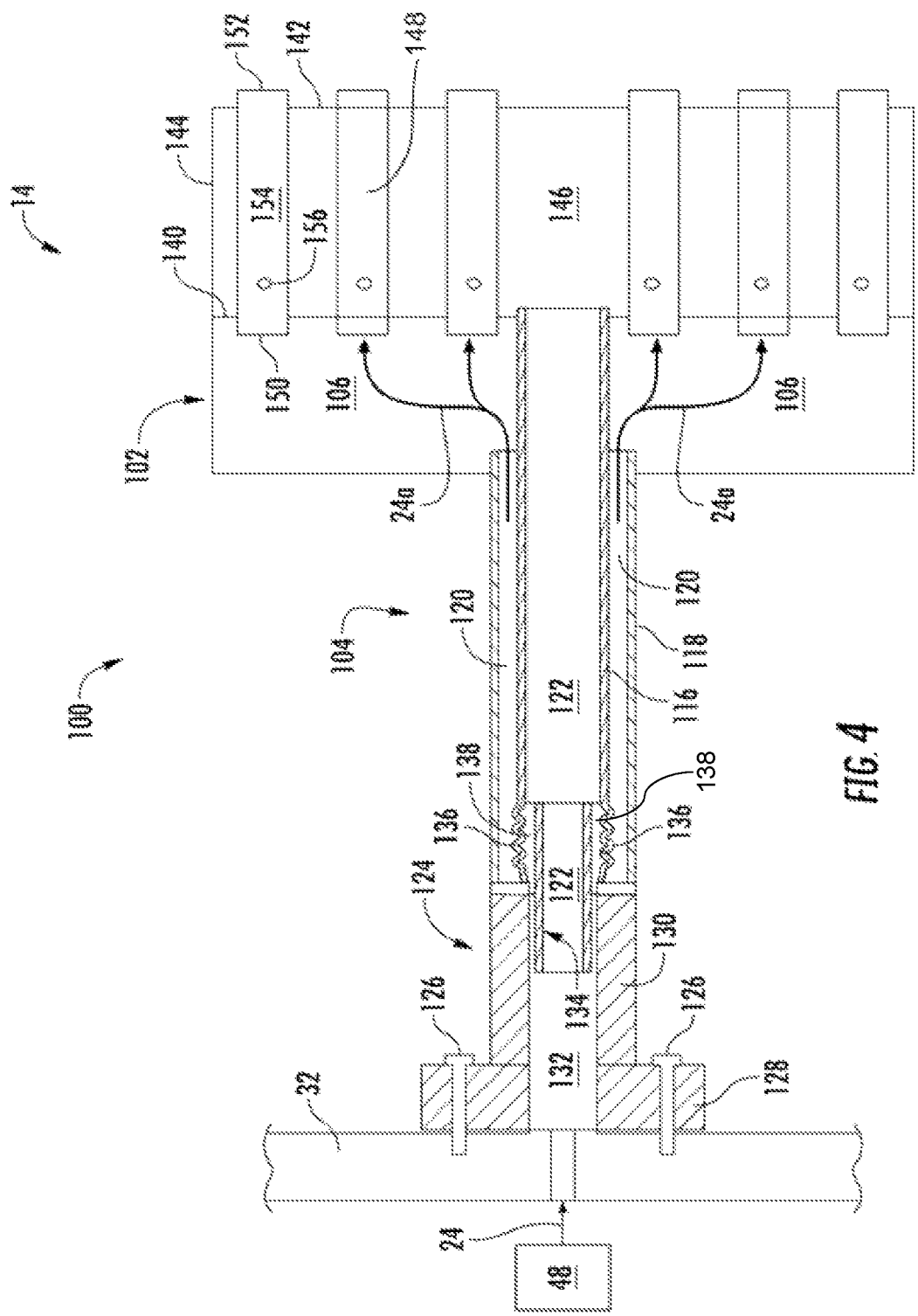
FIG. 4 is a cross-sectional side view of a portion of the combustor as shown in FIG. 2 according to at least one embodiment of the disclosure.

FIG. 4 provides a cross-sectional side view of a portion of the combustor 14 including the fuel nozzle assembly 100 according to at least one embodiment of the disclosure. In particular embodiments, the conduit assembly 104 includes an inner tube 116 disposed within and/or extending axially through an outer tube 118, A purge passage 120 is defined radially between the inner tube 116 and the outer tube 118. A fuel passage 122 is defined within the inner tube 116. The purge passage 120 is in fluid communication with the inlet flow plenum 106.

In various embodiments, the conduit assembly 102 is connected to the endcover 32 via a flange body 124. For example, the flange body 124 may be connected to the endcover 32 via one or more mechanical fasteners 126 such as but not limited to bolts, screws or the like. The flange body 124 includes a flange or flange portion 128 and a stem or stem portion 130. The stem 130 extends downstream or axially away from the flange portion 128. The flange body 124 defines a flow passage 132 through the flange portion 128 and the stem 130. The flange body 124 may be fluidly coupled to a fuel supply 48. In particular embodiments, a forward end or portion 134 of the inner tube 116 extends axially into the stem 130.

In particular embodiments, the outer tube 118 is connected to the stem 130 radially outwardly from the inner tube 116. The outer tube 118 may be brazed, welded or otherwise attached to the stem 130. The inner tube 116 is connected or coupled to the stem 130 via a coupling 136. The coupling 136 is disposed at least partially within the purge passage 120 and within the outer tube 118 and circumferentially surrounds a portion of the inner tube 116. The coupling 136 is flexible to allow for differential axial growth between the flange body 124 and the remainder of the fuel nozzle assembly 100. For example, in particular embodiments, the coupling 136 may be corrugated or a bellows coupling. The coupling 136 and the inner tube at least partially form an overflow or fuel leak plenum 138 that is in fluid communication with the flow passage 132 of the flange body 124 and/or with the fuel passage 122 of the inner tube 116.

In particular embodiments, as shown in FIG. 4, the fuel nozzle assembly 100 includes a first plate 140, a second plate 142 axially spaced from the first plate 140, and an outer band or sleeve 144 that extends axially between the first plate 140 and the second plate 142. A fuel plenum 146 is defined between the first plate 140, the second plate 142 and the outer band 144. A plurality of premix tubes 148 extends through the first plate 140, the fuel plenum 146 and the second plate 142. Each premix tube 148 includes an inlet 150, an outlet 152 and a premix flow passage 154 defined therebetween. The respective inlet 150 to one or more of the premix tubes 148 is disposed within the inlet flow conditioner 102 and is in fluid communication with the inlet flow plenum 106 and as such, the purge passage 120. One or more of the premix tubes 148 may include at least one fuel port 156 disposed within and in fluid communication with the fuel plenum 146.

The inner tube 116 and/or the fuel passage 122 is in fluid communication with the fuel plenum 146. The fuel passage provides for fuel flow from the fuel supply 48 into the fuel plenum 146. In particular embodiments, the inner tube 116 may be fixedly or rigidly connected to the first plate 140.

In operation, fuel 24 from the fuel supply 48 flows through the flow passage 132 and into the fuel passage 122 where it is delivered to the fuel plenum 146. As the combustor 14 transitions through various thermal transients, a portion of the fuel 24(a) may leak from the overflow plenum 138 around the coupling 136 and may then enter the purge passage 120. A first pressure drop between the fuel passage 122 and/or the flow passage 132 and the purge passage 120 allows the fuel 24(a) to enter the purge passage 120. A second pressure drop between the purge passage 120 and the inlet flow plenum 106 causes the fuel 24(a) to flow into the inlet flow plenum 106. The fuel 24(a) may then enter the respective inlets 150 of the premix tubes 148 where it may be mixed with fuel 24 entering the premix flow passage 154 via fuel port 156. The purge passage 120 prevents or reduces the likely hood of a flame holding event within the combustor 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A fuel nozzle assembly, comprising:
a flange body including a flange portion and a stem, wherein the flange body includes a flow passage defined through the flange portion and the stem;
a conduit assembly including an inner tube disposed within an outer tube, wherein a purge passage is defined radially between the inner tube and the outer tube and a fuel passage is defined within the inner tube, wherein the outer tube and the inner tube are connected to the stem, wherein the inner tube is connected to the stem via a coupling disposed within the purge passage, wherein the coupling circumferentially surrounds a forward portion of the inner tube, and wherein the purge passage is in fluid communication with an inlet flow plenum of the fuel nozzle assembly;
a plurality of premix tubes, wherein one or more premix tubes of the plurality of premix tubes includes an inlet disposed within and in fluid communication with the inlet flow plenum, and the inlet is in fluid communication with the purge passage; and
wherein a fuel leak plenum is defined radially between the coupling and the forward portion of the inner tube, wherein the fuel leak plenum is in direct fluid communication with the flow passage.

2. The fuel nozzle assembly as in claim 1, wherein the coupling is a bellows coupling.

3. The fuel nozzle assembly as in claim 1, wherein the fuel passage is in fluid communication with a fuel supply and the purge passage.

4. The fuel nozzle assembly as in claim 1, wherein the forward portion of the inner tube extends axially into the stem.

5. The fuel nozzle assembly as in claim 1, wherein there is a first pressure drop between the fuel passage and the purge passage and a second pressure drop between the purge passage and the inlet flow plenum.

6. The fuel nozzle assembly as in claim 1, wherein the inlet flow plenum is at least partially defined by an outer sleeve, a forward plate and a first plate of the fuel nozzle assembly.

7. The fuel nozzle assembly as in claim 6, wherein the outer sleeve extends axially from the forward plate to the first plate of the fuel nozzle assembly, and wherein the inner tube extends axially through the forward plate.

8. The fuel nozzle assembly as in claim 1, further comprising a second plate axially spaced from a first plate and an outer band that extends from the first plate to the second plate, wherein the first plate, the second plate and the outer band define a fuel plenum therebetween, and wherein the inner tube fuel passage is in fluid communication with the fuel plenum.

9. The fuel nozzle assembly as in claim 8, wherein each premix tube of the plurality of premix tubes extends through the fuel plenum and the second plate, and wherein each premix tube is in fluid communication with the fuel plenum.

10. A combustor, comprising:
an endcover coupled to an outer casing, wherein the endcover and the outer casing at least partially define a high pressure plenum;
a flange body connected to the endcover, the flange body including a flange portion and a stem that extends downstream from the flange portion, wherein the flange body defines a flow passage through the flange portion and the stem;

a conduit assembly including an inner tube disposed within an outer tube, wherein a purge passage is defined radially between the inner tube and the outer tube and a fuel passage is defined within the inner tube, wherein the inner tube is connected to an inner diameter of the stem via a coupling disposed within the purge passage, wherein the outer tube is connected to an outer diameter of the stem; and a fuel nozzle assembly, comprising:

an inlet flow plenum defined within an inlet flow conditioner; and a plurality of premix tubes, each premix tube of the plurality of premix tubes including an inlet disposed within and in fluid communication with the inlet flow plenum, wherein the purge passage of the conduit assembly is in fluid communication with the inlet flow plenum and with each respective inlet of the plurality of premix tubes; and wherein a fuel leak plenum is defined radially between the coupling and a forward portion of the inner tube, wherein the fuel leak plenum is in direct fluid communication with the flow passage.

11. The combustor as in claim 10, wherein the coupling is a bellows coupling.

12. The combustor as in claim 10, wherein the flow passage is in fluid communication with a fuel supply and the purge passage.

13. The combustor as in claim 10, wherein a portion of the inner tube extends axially into the stem.

14. The combustor as in claim 10, wherein there is a first pressure drop between the fuel passage and the purge passage and a second pressure drop between the purge passage and the inlet flow plenum.

15. The combustor as in claim 10, wherein the inlet flow plenum is at least partially defined by an outer sleeve, a forward plate and a first plate of the fuel nozzle assembly.

16. The combustor as in claim 15, wherein the outer sleeve extends axially from the forward plate to the first plate of the fuel nozzle assembly, and wherein the inner tube extends axially through the forward plate.

17. The combustor as in claim 10, further comprising a second plate axially spaced from a first plate and an outer band that extends from the first plate to the second plate, wherein the first plate, the second plate and the outer band define a fuel plenum therebetween, and wherein the inner tube fuel passage is in fluid communication with the fuel plenum.

18. The combustor as in claim 17, wherein each premix tube of the plurality of premix tubes extends through the fuel plenum and the second plate, and wherein each premix tube is in fluid communication with the fuel plenum.

19. The combustor as in claim 15, wherein the inlet flow plenum is in fluid communication with the high pressure plenum via a plurality of apertures defined in the forward plate or the outer sleeve.

* * * * *